(12) United States Patent
Hetzler et al.

(10) Patent No.: US 7,783,783 B2
(45) Date of Patent: Aug. 24, 2010

(54) SCSI DEVICE TRANSLATOR FOR NETWORK

(75) Inventors: Steven R. Hetzler, Los Altos, CA (US); Daniel F. Smith, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2817 days.

(21) Appl. No.: 10/102,930

(22) Filed: Mar. 22, 2002

(65) Prior Publication Data

US 2003/0182455 A1 Sep. 25, 2003

(51) Int. Cl.
*G06F 15/16* (2006.01)
(52) U.S. Cl. ........................... 709/250; 709/246
(58) Field of Classification Search ........ 709/201, 709/217, 236, 246, 250; 703/21, 25, 27
See application file for complete search history.

(56) References Cited

U.S. PATENT DOCUMENTS

| 4,972,470 | A  | * | 11/1990 | Farago ........................... 713/192 |
| 5,491,812 | A  | * | 2/1996  | Pisello et al. .................. 709/236 |
| 5,996,024 | A  | * | 11/1999 | Blumenau ...................... 719/326 |
| 6,073,201 | A  | * | 6/2000  | Jolley et al. ................... 710/315 |
| 6,209,023 | B1 | * | 3/2001  | Dimitroff et al. ............. 709/211 |
| 6,738,821 | B1 | * | 5/2004  | Wilson et al. ................. 709/230 |
| 6,862,648 | B2 | * | 3/2005  | Yatziv ............................ 710/315 |
| 2002/0062387 | A1 | * | 5/2002 | Yatziv ............................ 709/236 |

2003/0182455 A1 * 9/2003 Hetzler et al. ............... 709/250

OTHER PUBLICATIONS

S. Hotz et al., Internet Protocols for Network-Attached Peripherals, Proc. Sixth NASA Goddard Conference on Mass Storage Systems and Technologies in conjunction with 15th IEEE Symposium on Mass Storage Systems, Mar. 1999, http://www.isi.edu/netstatino/ip-for-naps.ps.
R. Van Meter et al., VISA: Netstation's Virtual Internet SCSI Adapter, http://www.isi.edu/netstation/visa.share.ps.

* cited by examiner

*Primary Examiner*—Nathan Flynn
*Assistant Examiner*—Mohamed Wasel
(74) *Attorney, Agent, or Firm*—Joseph P. Curtin; Mohammed Kashef

(57) ABSTRACT

A system and method for interfacing a non-SCSI device to a computer network for communicating with a SCSI device attached to the computer network is disclosed. An interface receives a SCSI-based communication message from the network that is intended for the non-SCSI device. The SCSI-based communication can be formatted for transport over, for example, a TCP/IP transport stream and includes, for example, a command descriptor block and accompanying data. A translator device converts a first SCSI-based communication message to a corresponding first non-SCSI communication message that is recognizable by the non-SCSI device. A translator device also receives a second non-SCSI communication message from the non-SCSI device and converts the second non-SCSI communication message into a corresponding second SCSI-based communication message. The interface device, responsive to the second SCSI-based communication message, sends the second SCSI based communication message to the network.

44 Claims, 5 Drawing Sheets

SCSI DEVICE TRANSLATOR FOR NETWORK

BACKGROUND OF THE INVENTION

1. Field of the Invention

The present invention relates to the field of network-attached peripheral devices. More particularly, the present invention relates to a system and method for interfacing a network-attached peripheral device to a host computer system.

2. Background of the Related Art

Presently, a host computer system can access remotely-located SCSI (small computer system interface) block devices over a computer network, whether a wide area network (WAN) or a local area network (LAN). For example, S. Holz et al., "Internet Protocols for Network-Attached Peripherals", Proc. Sixth NASA Goddard Conference on Mass Storage Systems and Technologies in conjunction with 15th IEEE Symposium on Mass Storage Systems, March, 1998 (http://www.isi.edu/netstation/ip-for-naps.ps), disclose an Internet Protocol (IP)-based technique for communicating with network attached peripherals (NAPs). According to Holz et al., the disclosed IP-based technique supports heterogeneous network media, wide-area connectivity and reduced research and development effort.

R. Van Meter et al., "VISA: Netstation's Virtual Internet SCSI Adapter" (http://www.isi.edu/netstation/visa.share.ps), disclose an implementation of a Virtual Internet SCSI Adapter (VISA) in which the UDP/IP protocol is used for reaching more than 80% of SCSI's maximum throughput without the use of network coprocessors.

U.S. Pat. No. 5,996,024 to Bhumenau relates to a SCSI network apparatus that presents a SCSI device interface to a host computer for translating SCSI commands in packets over a network to one or more network SCSI server applications on other computers or specialized controllers. U.S. Pat. No. 5,491,812 to Pisello et al. relates to a method and apparatus for interfacing a SCSI device directly to an Ethernet network.

The Internet Engineering Task Force has commissioned a workgroup to develop protocols for storage over IP networks. One of the proposed protocols is iSCSI, which encapsulates SCSI over TCP/IP (http://search.ietf.org:80/search/cgi-bin/BrokerQuery.pl.cgi?broker=internet-drafts$query=iscsi). iSCSI provides a mechanism for sending and receiving SCSI-based communication messages over a network.

Nevertheless, what is needed is a way to interface a host computer system to a remotely-located non-SCSI (heterogeneous) device over a computer network, thereby making the non-SCSI device appear to be a local SCSI device to the host computer.

BRIEF SUMMARY OF THE INVENTION

The present invention provides a way to interface a non-SCSI device to a computer network, for communication with a SCSI device connected to the computer network. A translation layer is provided to make the non-SCSI device appear as a SCSI device to the computer network. In this regard, the present invention provides a computer network with a SCSI view of a non-SCSI device. Further, the non-SCSI device may be of either the peripheral type or of the host system type, and the SCSI view may thus be a peripheral view (SCIS target) or a host system (SCSI initiator). This differs from connecting SCSI device over a network, where this is no need for a translation layer.

The advantages of the present invention are provided by a device for interfacing a non-SCSI device, such as an ATA device, an ATAPI device, an HDD, or an ATAPI host system, to a computer network, such as the Internet, a WAN, or a LAN, and thereby to a device interfaced to the computer network that communicates using SCSI-based communication messages, such as a SCSI host system or a SCSI peripheral. According to the invention, an interface device receives a first SCSI-based communication message from the network that is intended for the non-SCSI device. The SCSI-based communication message can be formatted for transport over, for example, the TCP/IP transport protocol, and includes a command descriptor block (CDB) and accompanying data. A translator device converts the first SCSI-based communication message to a corresponding first non-SCSI-based communication message that is recognizable by the non-SCSI device. A translator device also receives a second non-SCSI communication message from the non-SCSI device and converts the second non-SCSI communication signal to a corresponding second SCSI-based communication message. The interface device, responsive to the second SCSI-based communication message, sends the second SCSI-based communication message to the network.

BRIEF DESCRIPTION OF THE DRAWINGS

The present invention is illustrated by way of example and by not limitation in the accompanying figures in which like reference numerals indicate similar elements and in which.

DETAILED DESCRIPTION OF THE INVENTION

The present invention provides a way to interface a non-SCSI device to a computer network, for communication with a SCSI device connected to the computer network, thereby making the non-SCSI device appear to the network as a SCSI device attached to the network. According to the intention, a non-SCSI device performs a translation of a SCSI communication message in such a manner that a SCSI device cannot distinguish the non-SCSI device from a native SCSI device attached to the network. It is not necessary for the SCSI device to be aware that the non-SCSI device attached to the network is not a SCSI device. Further, the non-SCSI device may be made to appear as a SCSI host-type device (SCSI initiator) or SCSI peripheral-type device (SCSI target), as appropriate.

The present invention is particularly applicable to IP-based networks. In particular, use of TCP/IP as the transport protocol allows the attachment of devices over wide area networks (WANs) and local area networks (LANs) using a variety of physical network types, such as an Ethernet-based LAN. iSCSI, in particular, provides these advantages by sending SCSI communications using TCP/IP.

Figure 1:
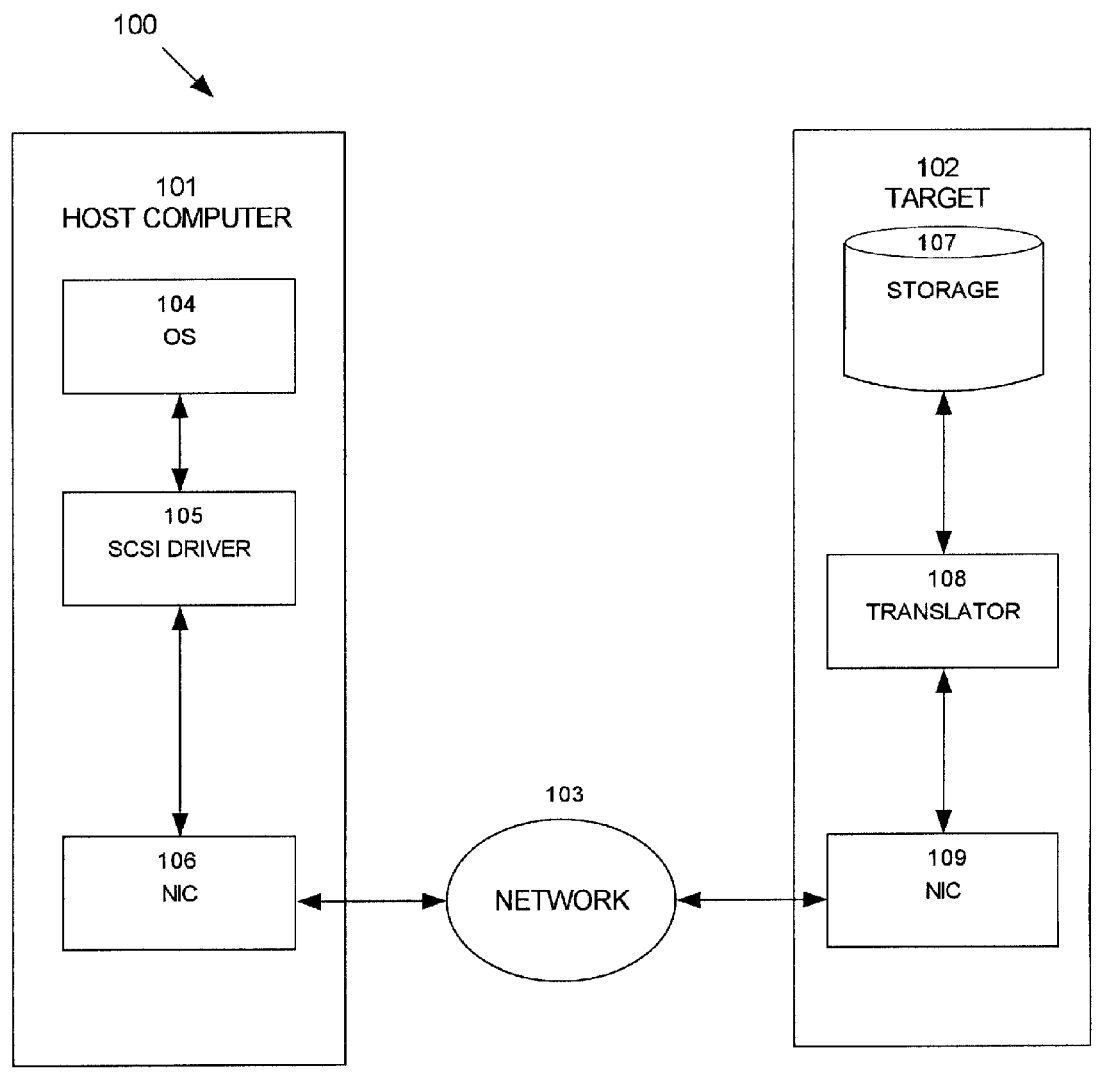
FIG. 1 shows a system block diagram of a basic configuration of the present invention.

FIG. 1 shows a system block diagram of a basic configuration 100 of the present invention. In FIG. 1, a host system 101, which includes an operating system (OS) 104, is connected to a target system 102 over a network 103, such as the Internet, a WAN, or a LAN. Target system 102 includes, for example, a non-SCSI storage device 107. Storage commands pass from OS 104 through a SCSI device driver 105, which converts the commands into communication messages for a network connection and for transmission through a network interface (NI) 106.

Target system 102 receives network communication messages through a network interface (NI) 109. A translator 108, connected to NI 109; receives the network communication messages from NI 109 and converts the communication messages to commands that are specific to storage device 107. SCSI commands that are not readily translated may be emulated or rejected by translator 108. For example, a command such as reserve/release requires translator 109 to retain state information for attachments, such as ATA, where there is no corresponding command. The procedure is followed in reverse for communicating results back to OS 104. While non-SCSI device 107 is shown as a storage device, device 107 can be any type of non-SCSI device that has an analog to a SCSI device type, such as an ATA HDD, a CD drive (player, recorder) and ATAPI DVD (Digital Versatile Disc) player/recorder, a scanner, a printer, a camera, etc.

Figure 2:
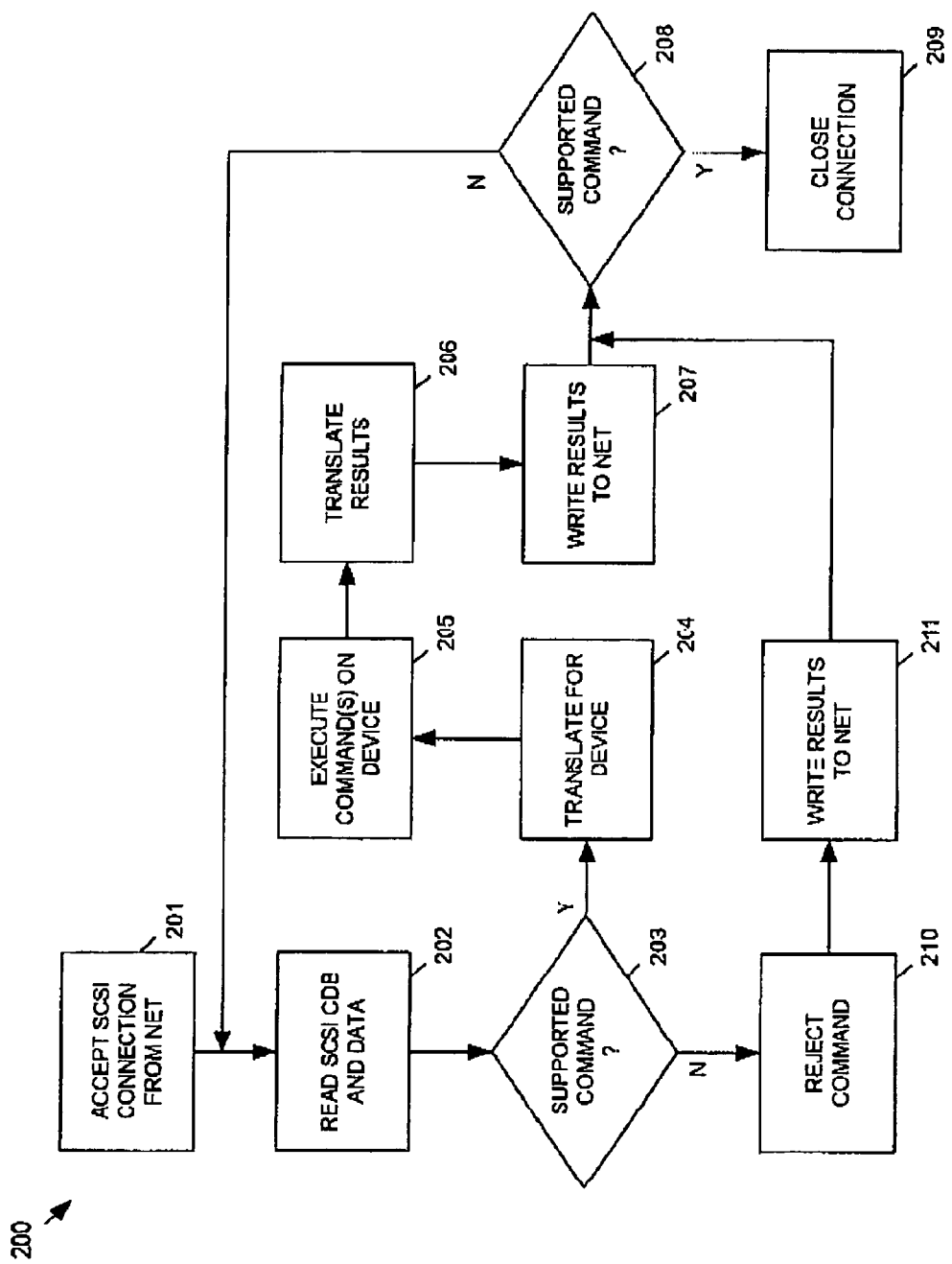
FIG. 2 shows a flow diagram used by translator within a target system for processing transmissions from a network according to the present invention.

FIG. 2 shows a flow diagram 200 used by translator 108 within target system 102 for processing communication messages from network 103. At step 201, a connection from network 103 is opened for filtering communication messages for the non-SCSI device that is associated with translator 108 from general network traffic. At step 202, a SCSI communication message, comprising a command descriptor block (CDB) and accompanying data, is read from the network 103. At step 203, the translator checks the contents of the CDB, such as the command value and the parameters, to determine if the command is supported. If the command is not supported, at step 210 the command is rejected and a SCSI rejection communication message is sent back on the network connection 103 at step 211. Control then passes to step 208, as described below. If the command is accepted at step 203, the SCSI communication message is translated from SCSI to the control set of the non-SCSI device for which the communication message is intended at step 204. At step 205, the translated command is sent to the non-SCSI device 107, after which the results from the non-SCSI device are translated back to the SCSI equivalent communication message at step 206. At step 207, the communication message corresponding to the results are sent back to the host system 101 over network 103. At step 208, it is determined whether the last command received over the network has been responded to. If not, flow continues to step 202 where the cycle of reading and writing continues. If, at step 208, the last command received over the network has been responded to, flow continues to step 209 where the network connection is closed. Accordingly, there may be many concurrent operations occurring within translator 108, and some aspects of the SCSI communication message maybe handled within translator 108.

The details of the device translation depend on the type of the non-SCSI device and the supported SCSI commands. The following examples illustrate some of the situations encountered for the case where the non-SCSI device is an ATA Hard Disk Drive (HDD).

Read Capacity is a SCSI command that retrieves the block size of the device, and the number of transferable data blocks on the device minus 1. (It can also operate to provide additional information that is rarely used.) ATA provides the command Read Native Mux Address; a command that retrieves the maximum block address on the device. All ATA devices have a fixed 512-byte block size. Further, the SCSI device returns the information in a data transfer, while the ATA device gathers the information without a data transfer.

Figure 3:
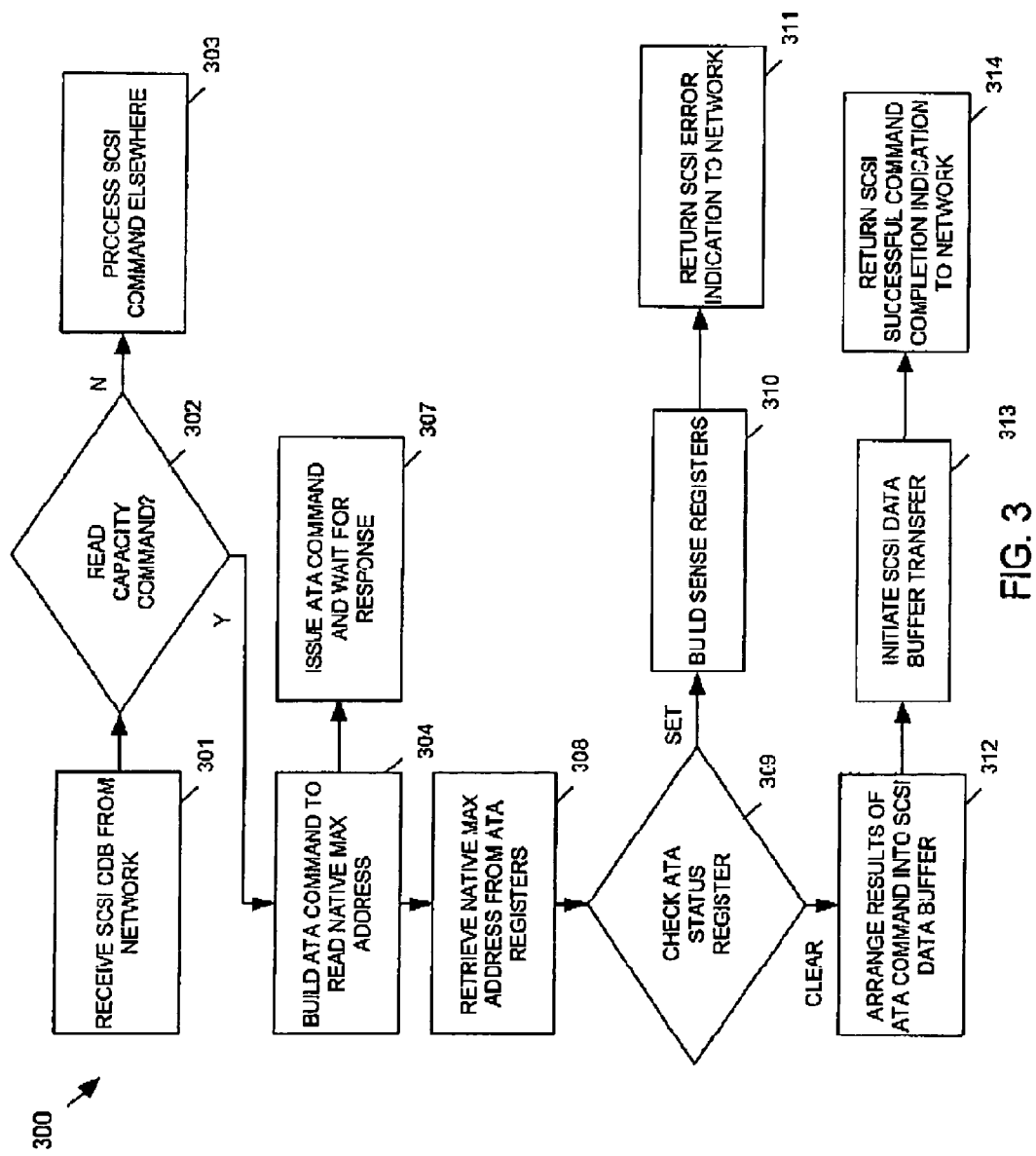
FIG. 3 shows a flow diagram of the operation of the system performing a SCSI Read Capacity command according to the present invention.

FIG. 3 shows a flow diagram 300 of the translation operation for a SCSI Read Capacity command. At step 301, a SCSI CDB is received from over the network and checked to see whether it is a Read Capacity command with no special options at step 302. If the received command is not a Read Capacity command, then the command is processed elsewhere at step 303. After successfully determining the command class is Read Capacity, the translator must determine the capacity of the ATA device by building at step 304 and issuing the command at step 307 for Read Native Max Address to the ATA drive. Once the command has completed, the ATA registers 3, 4, 5 and 6 contain the maximum address block at step 308. An ATA status register is also returned, and must be checked at step 309 so that should the ATA drive have failed in some way, this can be responded to by building the appropriate SCSI sense registers at step 310 and returning a SCSI error indicator at step 311 to the network.

The final translation is to arrange the results of the ATA command into a SCSI data buffer at step 312 for transfer back to the network at step 313 and returning a successful SCSI command completion message to the network at step 314.

As a further example, the SCSI Read(10) command retrieves the data stored in up to 65535 blocks on the device starting at a block address given in a 32-bit number. ATA provides a similar command (Read DMA) that can retrieve up to 256 blocks starting at an address given in a 28-bit number. Hence, to provide complete command coverage, several ATA commands may need to be issued to cover the single SCSI command.

Figure 4:
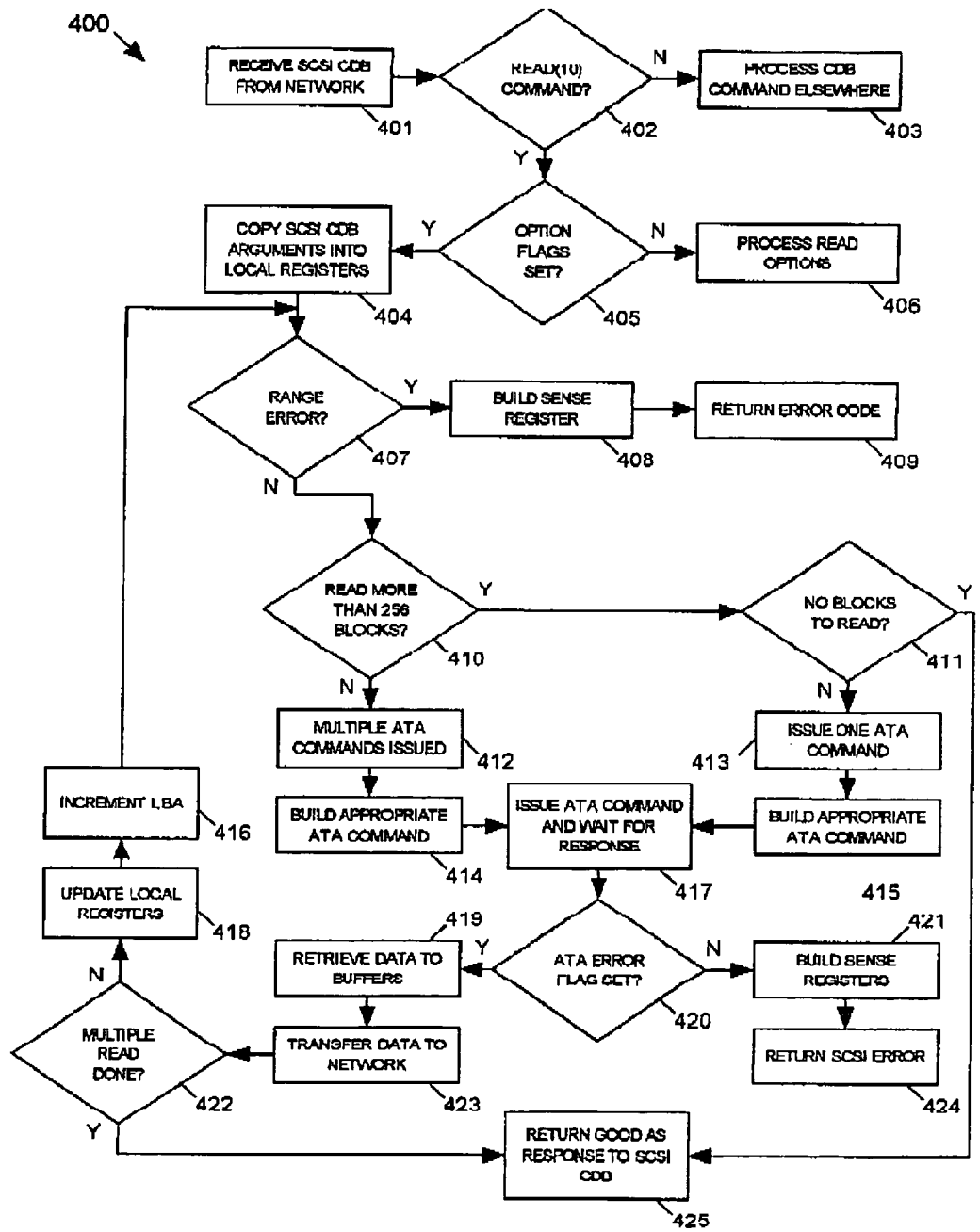
FIG. 4 shows a flow diagram of the operation of the system performing a SCSI Read(10) command according to the present invention.

FIG. 4 shows a flow diagram 400 of the translator operation for a SCSI Read 10 command. At step 401, a SCSI CDB is received from the network and checked to see whether it is a Read(10) command at step 402. If it is not, then the CDB is processed elsewhere at step 403. The Read(10) command can have several special option flags set, so this is checked at step 405 and if there are any set they are processed appropriately at step 406. This example follows the common case of no flags. The SCSI CDB arguments are copied into local registers at step 404. Since ATA devices have a smaller address space than SCSI, the LBA number must be range checked at step 407 and an appropriate error code returned at step 408 to the SCSI initiator at step 409 if it is out of range.

The arguments are checked at step 410 to determine if more than 256 blocks should be read by this command. If so, then multiple ATA commands will be issued at step 412. If, however, there are no blocks to read at step 411, then the command is successfully completed at step 425. Otherwise, if there are between 1 and 256 blocks to read (inclusive), this can be done in a one (final) ATA command at step 413. The appropriate ATA command is constructed (at step 414 or 415) and issued at step 417. Then the ATA status must be checked at step 420 and a SCSI error at step 421 is returned at step 424 to the network translator should the read have failed.

If the ATA command successfully completed, then the data is retrieved into the data buffers of the translator at step 419 and transferred back over the network at step 423. If this process is part of a multiple ATA operation, as determined at step 422, then the local registers must be updated at steps 418 and 416 and the read operations continued at step 407. Once the final operation has completed at step 412, then the operation has been successful and the ultimate result is returned over the network at step 415.

The examples shown here illustrate the operation of the system for common SCSI commands. The operation for other commands, such other SCSI Read and Write commands, will be apparent from the above description. Other commands that have no equivalent for the non-SCSI device, such as Search Data Equal, may be emulated within the translator in a manner consistent with the operation of a SCSI device.

Figure 5:
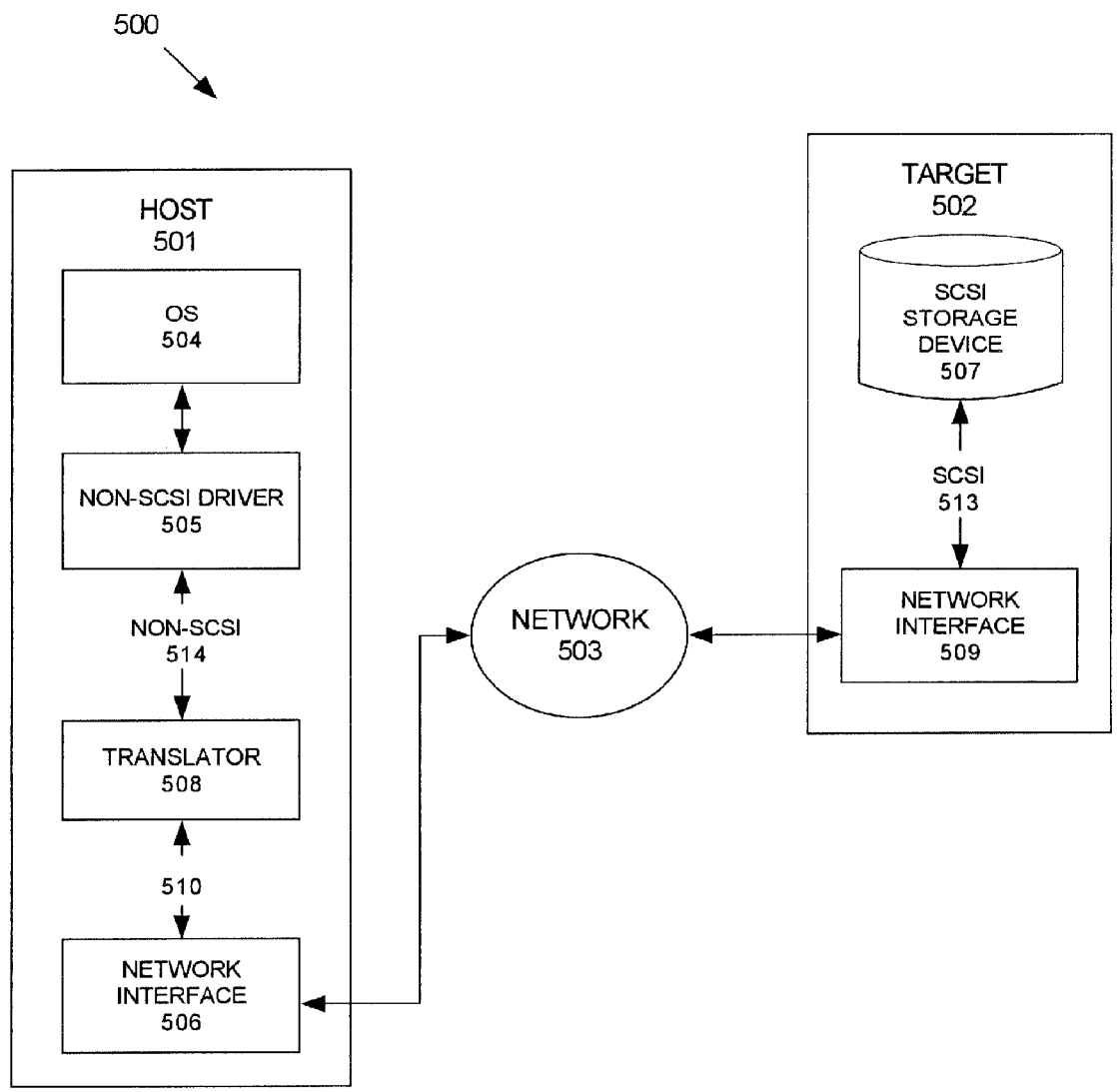
FIG. 5 shows a system block diagram of another configuration of the invention, wherein the non-SCSI device is a host system and the peripheral device is a SCSI device.

It is also possible to have a non-SCSI system communicate with a SCSI device in an analogous fashion. FIG. 5 is a block diagram 500 of the connection of a non-SCSI host system to a SCSI peripheral device. A non-SCSI host system 501, which includes an operating system 504, and is connected to a remotely located target system 502 over a network 503. Target system 502 includes a SCSI storage device 507 and network interface 509. Host system 501 generates non-SCSI storage commands 514 internally 505. Translator unit 508 converts these commands to equivalent SCSI commands 510 using the inverse of the translation procedures described previously. In this manner, the non-SCSI host system generates and responds to SCSI-based communications over the network through network interface 506. While the SCSI device 507 has been described as a storage device, it can be of any device type that presents a SCSI device interface to the network 503.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A device for interfacing a non-SCSI device to a network, comprising:
   a network interface sending and receiving information over the network;
   an interface driver receiving and extracting a first SCSI-based communication message from the network, the first SCSI-based communications message including a command descriptor block and accompanying data; and
   a translator device converting the first SCSI-based communication message to a corresponding first non-SCSI-based communication message that is recognizable by the non-SCSI device, the translator examining information within the command descriptor block to determine whether to accept or reject the command.

2. The device according to claim 1, wherein the translator device receives a second non-SCSI communication message from the non-SCSI device and converts the second non-SCSI communication message to a corresponding second SCSI-based communication message, and
   wherein the interface device, responsive to the second SCSI-based communication message, sends the second SCSI-based communication message to the network.

3. The device according to claim 1, wherein the first SCSI-based communication message includes a read command.

4. The device according to claim 3, wherein the first non-SCSI communication message comprises a plurality of read commands corresponding to the SCSI-based read command.

5. The device according to claim 1, wherein the first SCSI-based communication message includes a write command.

6. The device according to claim 5, wherein the first non-SCSI communication message comprises a plurality of write commands corresponding to the SCSI-based write command.

7. The device according to claim 1, wherein the translator generates a SCSI rejection communication message for a rejected command.

8. The device according to claim 1, wherein the non-SCSI device is an ATA device.

9. The device according to claim 1, wherein the non-SCSI device is an ATAPI device.

10. The device according to claim 1, wherein the non-SCSI device is an HDD.

11. The device according to claim 1, wherein the non-SCSI device is an optical drive.

12. The device according to claim 11, wherein the non-SCSI device is a DVD drive.

13. The device according to claim 1, wherein the non-SCSI device is an ATA host system.

14. The device according to claim 1, wherein the non-SCSI device is an ATAPI host system.

15. The device according to claim 1, wherein the first SCSI-based communication message is transported by the TCP/IP protocol.

16. The device according to claim 1, wherein the first SCSI-based communication message is transported by the iSCSI protocol.

17. The device according to claim 1, wherein the network is the Internet.

18. The device according to claim 1, wherein the network is a wide area network.

19. The device according to claim 1, wherein the network is a local area network.

20. The device according to claim 17, wherein the network is an Ethernet network.

21. A device for interfacing a non-SCSI device to a network, comprising:
   a network interface sending and receiving information over the network;
   an interface device receiving and extracting a first SCSI-based communication message from the network, the first SCSI-based communication message having no corresponding non-SCSI-based communication message; and
   a translator device generating a first non-SCSI-based communication message emulating the first SCSI-based communication message.

22. The device according to claim 21, wherein the translator generates a second SCSI-based communication message, and
   wherein the interface device, responsive to the second SCSI-based communication message, sends the second SCSI-based communication message to the network.

23. A method for interfacing a non-SCSI device to a network, the method comprising:
   receiving a first SCSI-based communication message from the network that is intended for the non-SCSI device, the first SCSI-based communication message including a command descriptor block and accompanying data;
   examining information within the command descriptor block;
   determining whether to accept or reject the command based on the examined information; and
   converting the first SCSI-based communication message to a corresponding first non-SCSI-based communication message than is recognizable by the non-SCSI device.

24. The method according to claim 23, further comprising:
   receiving a second non-SCSI communication message from the non-SCSI device;
   converting the second non-SCSI communication message to a corresponding second SCSI-based communication message; and sending the second SCSI-based communication message to the network.

25. The method according to claim 23, wherein the first SCSI-based communication message includes a read command.

26. The method according to claim 25, further comprising converting the SCSI-based read command into a plurality of read commands in the first non-SCSI-based communication message.

27. The method according to claim 23, wherein the first SCSI-based communication message includes a write command.

28. The method according to claim 27, further comprising converting the SCSI-based write command into a plurality of write commands in the first non-SCSI communication message.

29. The method according to claim 23, further comprising generating a SCSI rejection communication message for a rejected command.

30. The method according to claim 23, wherein the non-SCSI device is an ATA device.

31. The method according to claim 23, wherein the non-SCSI device is an ATAPI device.

32. The method according to claim 23, wherein the non-SCSI device is an HDD.

33. The method according to claim 23, wherein the non-SCSI device is an optical drive.

34. The method according to claim 33, wherein the non-SCSI device is a DVD drive.

35. The method according to claim 23, wherein the non-SCSI device is an ATA host system.

36. The method according to claim 23, wherein the non-SCSI device is an ATAPI host system.

37. The method according to claim 23, wherein the first SCSI-based communication message is transported by the TCP/IP protocol.

38. The method according to claim 23, wherein the first SCSI-based communication message is transported by the iSCSI protocol.

39. The method according to claim 23, wherein the network is the Internet.

40. The method according to claim 23, wherein the network is a wide area network.

41. The method according to claim 23, wherein the network is a local area network.

42. The method according to claim 41, wherein the network is an Ethernet network.

43. A method for interfacing a non-SCSI device to a network, the method comprising:
    receiving and extracting a first SCSI-based communication message from the network that is intended for the non-SCSI device, the first SCSI-based communication message having no corresponding non-SCSI communication message; and
    emulating the first SCSI-based communication message.

44. The method according to claim 43, further comprising:
    generating a second SCSI-based communication message; and
    sending the second SCSI-based communication message to the network.

* * * * *